United States Patent
Baleta et al.

(10) Patent No.: US 7,302,361 B2
(45) Date of Patent: Nov. 27, 2007

(54) MODULAR TELECOMMUNICATION TEST UNIT

(75) Inventors: Pere Baleta, Santa Feliu de Llobregat (ES); Salvador Borras, Barcelona (ES); Jordi Colomer, Barcelona (ES); Thomas Neher, Sant Marti Sarroca (ES)

(73) Assignee: Trend Communications, Inc., Loudwater (GB)

( * ) Notice: Subject to any disclaimer, the term of this patent is extended or adjusted under 35 U.S.C. 154(b) by 235 days.

(21) Appl. No.: 10/723,176

(22) Filed: Nov. 26, 2003

(65) Prior Publication Data

US 2005/0114080 A1 May 26, 2005

(51) Int. Cl.
G06F 11/30 (2006.01)
H04M 1/24 (2006.01)

(52) U.S. Cl. ......................................... 702/182; 379/21
(58) Field of Classification Search ................ 702/182, 702/57; 379/21; 370/241; 345/905; 356/73.1
See application file for complete search history.

(56) References Cited

U.S. PATENT DOCUMENTS

| | | | | |
|---|---|---|---|---|
| 2,659,976 A | * | 11/1953 | Leo | 33/341 |
| 3,956,601 A | * | 5/1976 | Harris et al. | 379/21 |
| 4,943,932 A | * | 7/1990 | Lark et al. | 706/60 |
| 5,511,108 A | | 4/1996 | Severt et al. | 379/21 |
| 5,602,750 A | | 2/1997 | Severt et al. | 702/122 |
| 5,619,489 A | | 4/1997 | Chang et al. | 370/241 |
| 5,621,664 A | * | 4/1997 | Phaal | 702/57 |
| 5,677,633 A | | 10/1997 | Moser et al. | 324/539 |
| 5,892,756 A | * | 4/1999 | Murphy | 370/241 |
| 6,064,721 A | * | 5/2000 | Mohammadian et al. | 379/21 |
| 6,098,028 A | * | 8/2000 | Zwan et al. | 702/120 |
| 6,385,300 B1 | * | 5/2002 | Mohammadian et al. | 379/21 |
| 6,405,049 B2 | | 6/2002 | Herrod et al. | 455/517 |
| 6,434,221 B1 | | 8/2002 | Chong | 379/27.01 |
| 6,453,014 B1 | * | 9/2002 | Jacobson et al. | 379/26.01 |
| 6,467,055 B1 | * | 10/2002 | Katuszonek | 714/43 |
| 6,516,053 B1 | * | 2/2003 | Ryan et al. | 379/21 |
| 6,590,963 B2 | * | 7/2003 | Mohammadian et al. | 379/21 |
| 6,657,966 B1 | * | 12/2003 | Kramarczyk et al. | 370/241 |
| 6,738,454 B2 | * | 5/2004 | Mohammadian et al. | 379/21 |
| 6,801,307 B2 | * | 10/2004 | Ziegler et al. | 356/73.1 |
| 7,065,470 B2 | * | 6/2006 | Seel | 702/183 |
| 7,116,410 B2 | * | 10/2006 | French et al. | 356/73.1 |

(Continued)

OTHER PUBLICATIONS

Sunrise Telecom, STT Next-Generation Optical Network Test Solution, www.sunrisetelecom.com/stt/stt_brochure.pdf, Oct. 3, 2003.*

(Continued)

*Primary Examiner*—John Barlow
*Assistant Examiner*—Toan M. Le
(74) *Attorney, Agent, or Firm*—Thomas, Kayden, Horstemeyer, & Risley, L.L.P.

(57) ABSTRACT

A test unit for data communication networks is formed by placing one or more application modules between a front module and a rear module. The modules are secured together with a latching system and a bus structure provides for control and performance information transfers between modules. The front module may serve a user interface via a touch screen. In addition, the front module has a variety communication ports that provide for one or more remote user interfaces. Battery packs are located in the front module and the rear module for providing power to the test unit.

31 Claims, 10 Drawing Sheets

U.S. PATENT DOCUMENTS

| | | | |
|---|---|---|---|
| 2002/0109509 A1 | 8/2002 | Ziegler er al. | 324/556 |
| 2002/0113610 A1 | 8/2002 | Griffin et al. | 324/754 |
| 2002/0150217 A1 | 10/2002 | Haines | 379/22.02 |
| 2002/0175689 A1 | 11/2002 | White et al. | 324/628 |
| 2003/0048756 A1 | 3/2003 | Chang et al. | 370/252 |
| 2005/0041048 A1* | 2/2005 | Hillman et al. | 345/905 |

OTHER PUBLICATIONS

Hewlett-Packard Development Company, L.P., ATM Test Modules for HP37717C Communications Performance Analyzer, East Your Network's Migration to ATM, (1996).

Trend Communications, Ltd., Aurora Tango, pp. 1-12, (2001).

Sunrise Telecom, SunWorks, (Jul. 2002).

EXFO Electro-Optical Engineering, Inc., Sonet/SDH 10 Gb/s Test Modules, FTB-8000 Series, (2002).

Sunrise Telecom, STT Next-Generation Optical Network Test Solution, (Dec. 2002).

Trend Communications., Victoria STM-N/OC-M, (Mar. 2002).

Trend Communications, Victoria STM-16/OC-48, (Nov. 15, 2002).

ICT Electronics, Plus Flexacom, (Jun. 1998).

* cited by examiner

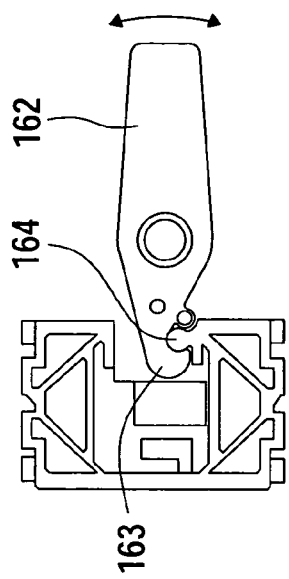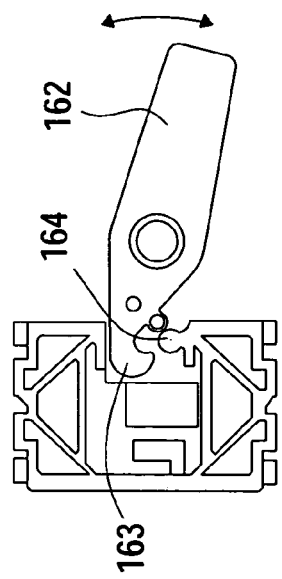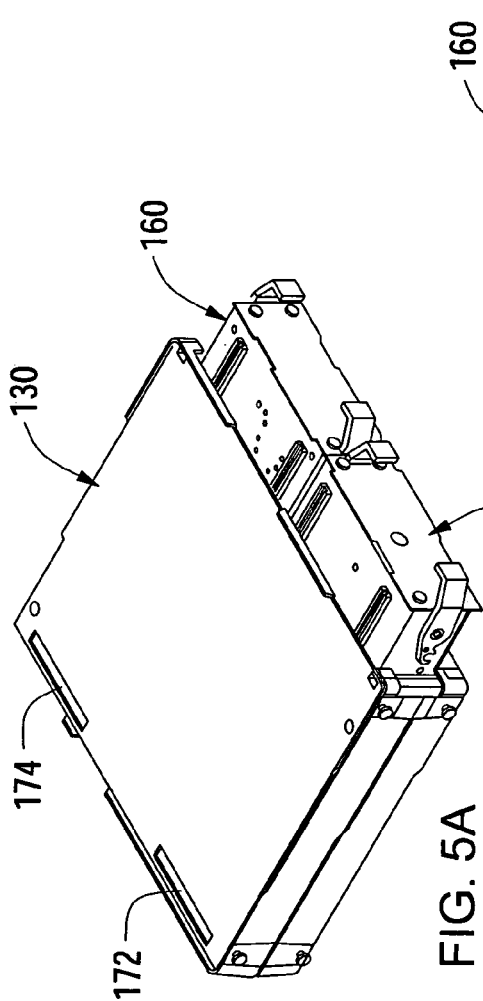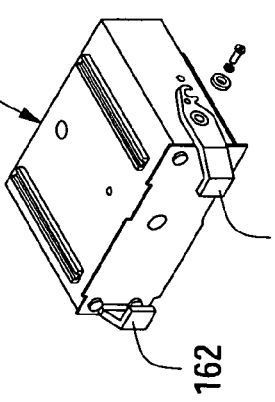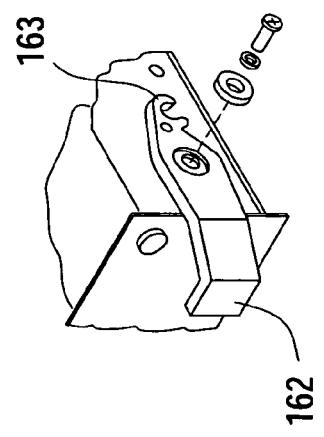

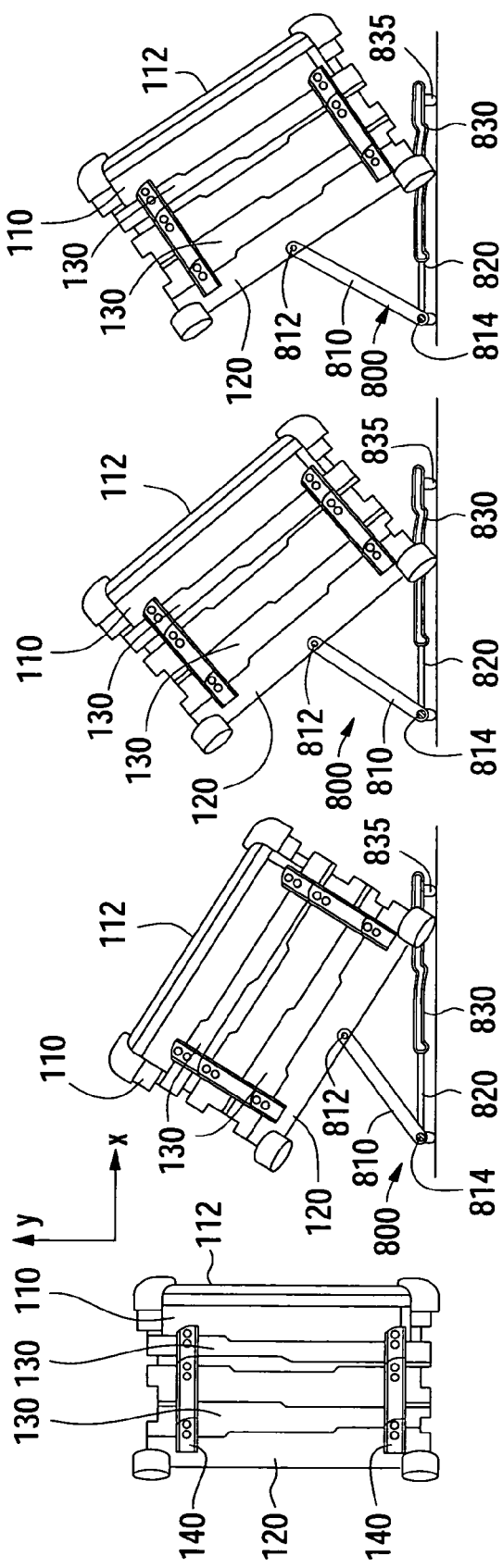

MODULAR TELECOMMUNICATION TEST UNIT

BACKGROUND OF THE INVENTION

1. Field of the Invention

The present invention generally relates to the field of telecommunication test equipment and, in particular, to a modular system for providing a plurality of test functions. One or more application modules are coupled between a front module and a rear module wherein each of the application modules is configured to measure performance information associated with a type of communication link.

2. Related Art

Digital communication networks providing a multitude of services such as voice, video and internet connections rely on transport of information over a variety of physical channels and connection protocols. Further, many of the physical channels are connected to multiplexers that combine low-speed data channels into higher-speed data channels. For example, in T-carrier technology, 24 DS0 signals of 64 Kbps each are combined to form a single DS1 signal of 1.544 Mbps. There exists within the telecommunications or data communications network a hierarchy of signals that are described in text books, ANSI Standards, ITU Standards and elsewhere. The world wide data communication network, although continually evolving, is well defined and provides data transport services for a variety of needs from, for example, email, web services, transport of medical images and other known uses.

In order to monitor and evaluate the health of the data communication network or to determine if a communication link of the network is faulty, it is usually necessary to connect test equipment to a variety of communication links or transport layers. When each communication link is monitored to determine if a performance specification is met, then a network provider is able to isolate the problem and restore data communication service to their customers.

One of the problems with existing test equipment is that each test unit is designed to monitor specific types of data links. For example, a first test unit may test data transport over twisted wire pairs and may be capable of testing DS1, DS3 or ISDN service. A second test unit may be used to test for higher speed data links using coaxial cable. Yet a third unit may be utilized to test components of an optical network.

Hence, it is desirable to have a single test unit capable of gathering performance data on various types of data communication links that form the data communication network. Further, it is desirable to have a test unit that is easy to reconfigure or modify in order to adapt to a variety of test scenarios and to meet the test requirements for new data communication technologies.

SUMMARY OF THE INVENTION

Generally, the present invention provides an apparatus, system, and method for monitoring communication links of a data communication network. An apparatus of the present invention is capable of gathering performance data from multiple types of communication links and displaying the performance data on a display screen of the apparatus or at a terminal at a central site of a service provider.

In one embodiment a telecommunication test unit for evaluating the performance of a data link is comprised of a rear module, a front module for controlling the test unit and processing performance information, and one or more application module electrically connected and mechanically secured between the rear module and the front module, wherein each application module is coupled to one or more data links and provides performance information for a display device.

In another embodiment, a method for providing a test unit with performance information about a data communication link comprises the steps of: providing a back module with a power source and a front module for controlling the test unit and receiving performance information, selecting an application module adapted for monitoring the performance of the data link, and stacking the front module, application module, and back module in sequence and electrically connecting and mechanically securing the modules together so that the stacked modules form the test unit.

In another embodiment, the rear module of the test unit has a retractable multi-position foot wherein the multi-positional foot is comprised of one or more support arms pivotally connected on one end to the back of the rear module near the center, an adjustment arm pivotally connected on one end to the other end of each support arm, and a slotted retainer connected to the other end of the adjustment arm wherein slots in the slotted retainer are adapted to snap to a rod on the bottom edge of the rear module.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIGS. 5A-E are diagrams of an application module having sub-modules for the test unit of FIG. 1.

FIGS. 8A-E illustrate a multi-position foot used to provide various viewing angles for the test unit of FIG. 1.

DETAILED DESCRIPTION

The present invention generally pertains to a telecom test unit used to evaluate the status of various types of communication links of a data communication network. Because different communication links utilize different transport technologies, it is typically necessary to have multiple test units or one test unit that is capable testing a variety of transport technologies. A test unit capable of testing a variety of transport technologies should be adaptable for meeting the needs of equipment manufacturers and service providers. An exemplary modular test unit described herein, with reference to FIGS. 1 and 2, has a unique arrangement of stackable modules allowing for multiple functionality of one unit and reuse of a front module and a rear module.

Figure 1:
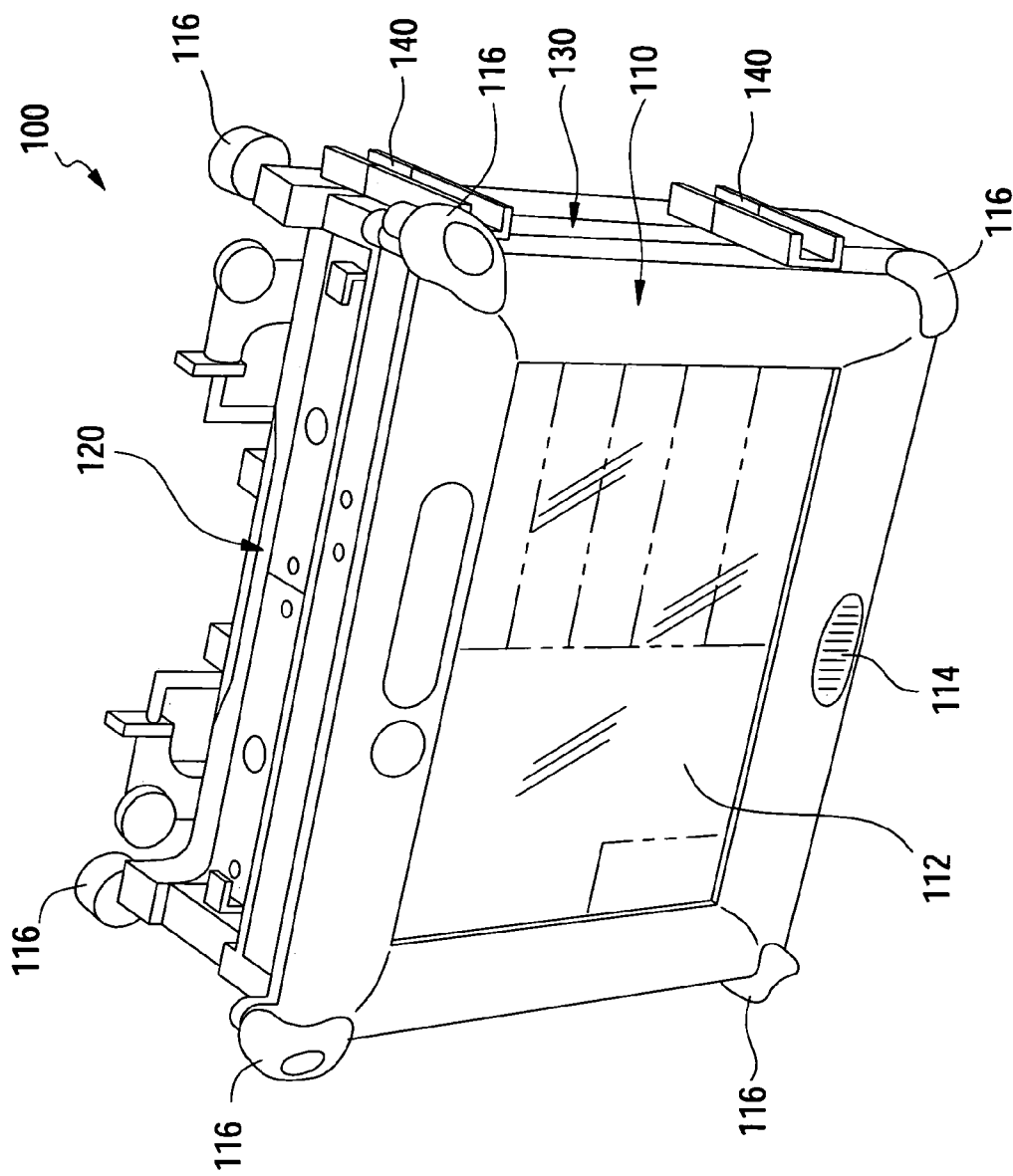
FIG. 1 is a diagram of an assembled telecom test unit in accordance with one exemplary embodiment of the present invention.

The modular test unit 100 of FIG. 1 has a front module 110, a rear module 120 and an application module 130 placed therebetween. Although only a single application module 130 is shown in FIG. 1, additional application modules 130 maybe placed between the front module 110 and the rear module 120. The front module 110 is shown having a touchscreen 112, a loudspeaker 114 and protective corner guards 116. In addition, the front module 110 is battery powered, has one or more processing and memory elements, is connected to a test unit bus ("bus"), has a standby mode display and other elements. The front module 110 preferably receives information and data from one or more application modules, processes and displays the information and data, and in addition functions as an interface between the test unit 100 and a test unit user. The rear module 120 preferably contains a rear battery for furnishing power to the application module 130 and has a connection for charging batteries from an external power source. In addition, the rear module 120 preferably has a multi-position foot, adjustable by the user, for placing the test unit 100 in several viewing positions.

Figure 3A:
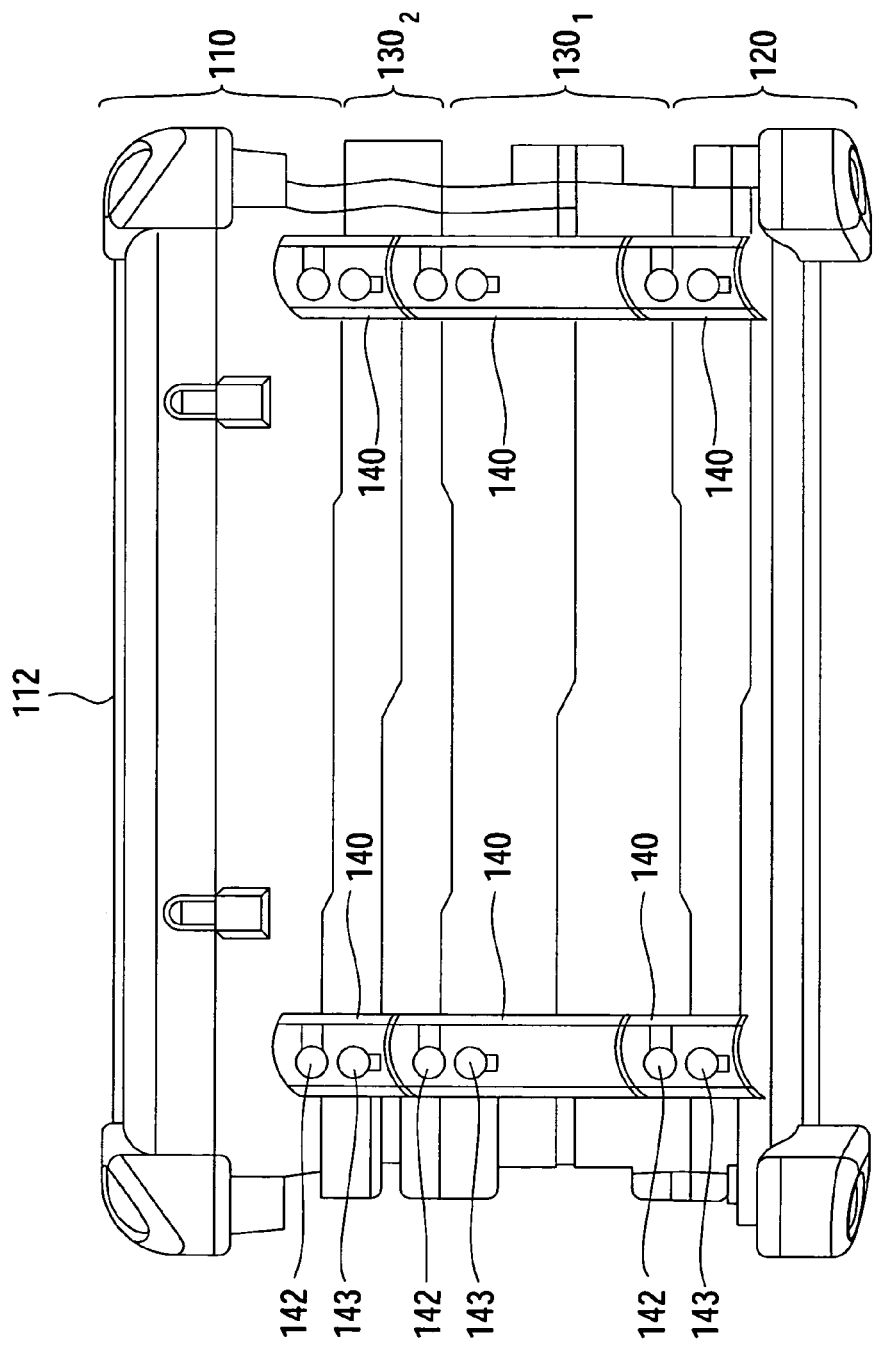
FIG. 3A-B are side views of the test unit of FIG. 1 with the modules of FIG. 2 showing a clip arrangement.
Figure 3B:
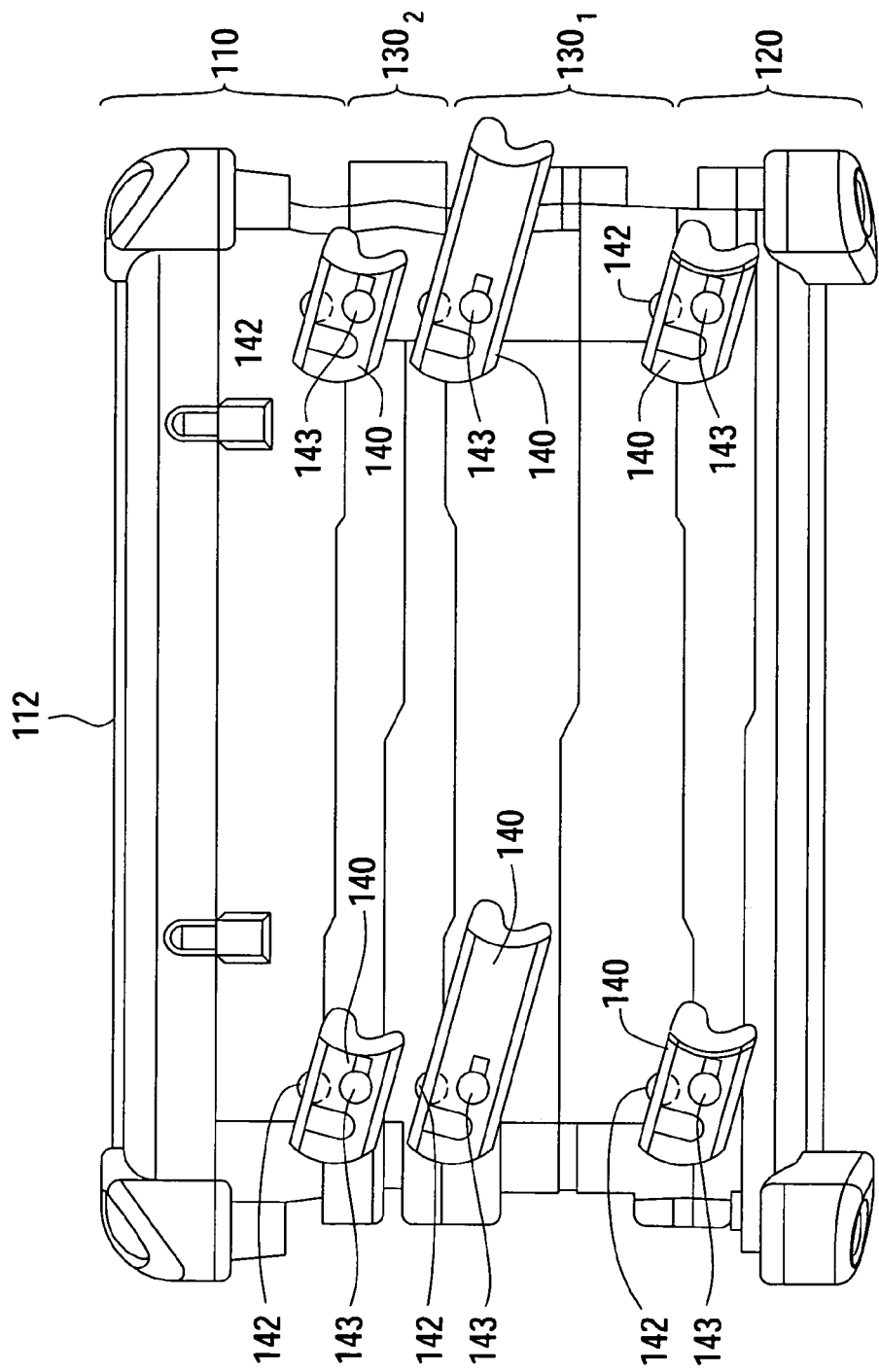

The modular test unit 100 as shown in FIG. 1 is an assembly of stackable modules and, as shown, is available to provide a test function consistent with the installed application module 130. On the right side of the test unit 100, fast reconfiguration clips ("clips") 140 are latched to secure the modules together. Preferably there are four clips 140 securing the front module 110 to the application module 130 and four clips securing the rear module 120 to the application module 130. The clips 140 are adapted for quick latching and unlatching, and the latching and unlatching may occur sequentially, as will be described when referring to FIG. 3.

Figure 2:
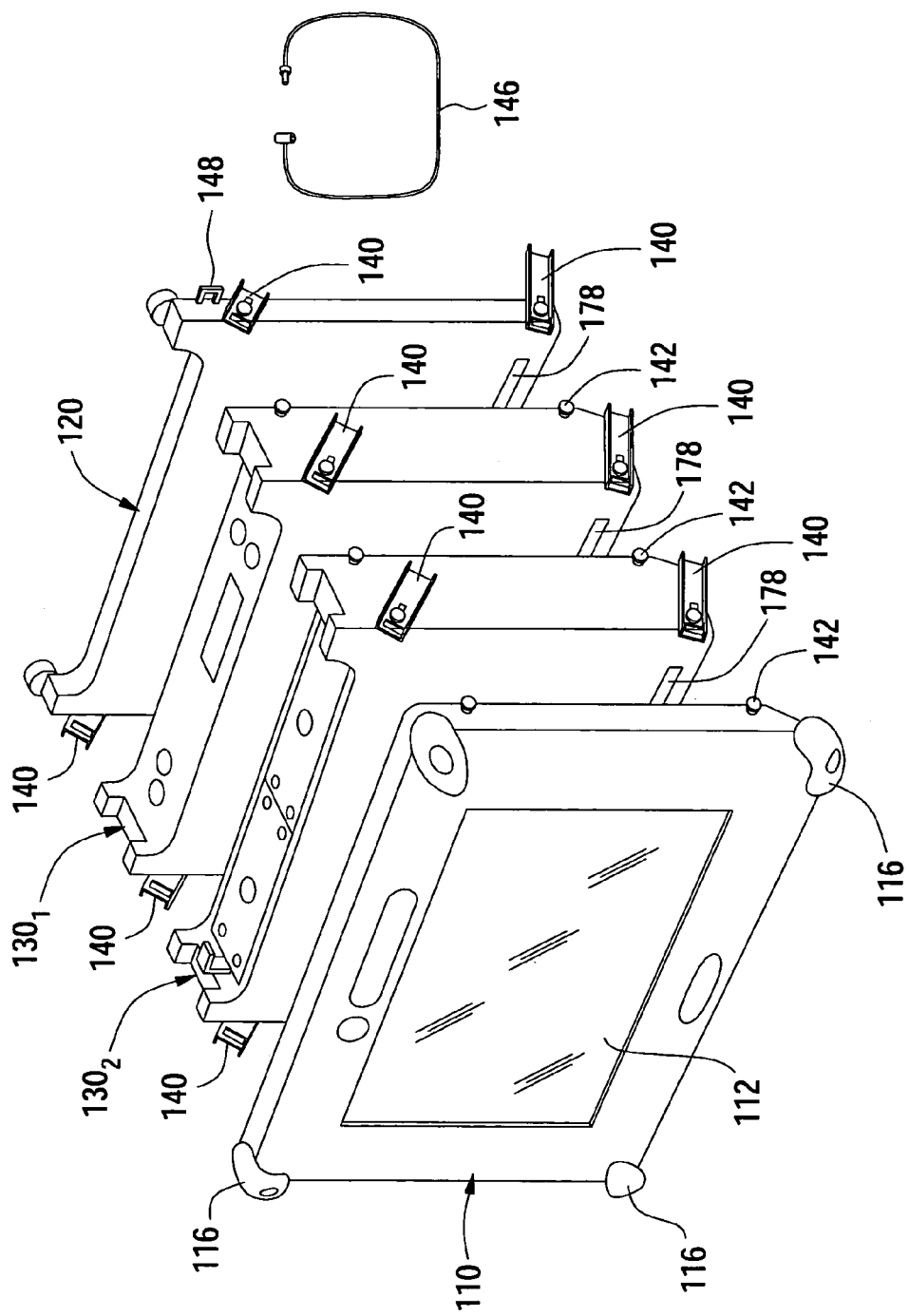
FIG. 2 is a diagram of the telecom test unit of FIG. 1 illustrating modules positioned for assembly.

FIG. 2 illustrates the test unit 100 before the modules 110, 120, 130 of the test unit are secured together with the clips 140. For position location identification, the application modules 130 are sequentially numbered with subscripts from 1 to N starting at the rear module 120. Hence the application module $130_1$ is next to the rear module 120 and the application module $130_2$ is next to the front module 110 when the subscripts go from 1 to N=2. Each application module $130_i$ may be adapted to provide a different test function and has a corresponding link processing circuit. The front module 110 is shown with protective corner guards 116 and the touchscreen 112. In a preferred embodiment, the front module 110 has coupling pins 142, for attachment to clips 140 on the adjacent application module $130_2$. When the adjacent application module $130_2$ is pushed or moved in contact with the front module 110 and electrical connectors are engaged forming a segmented bus 144, then clips 140 on the adjacent application module are rotated and snap on the coupling pins 142 of the front module 110. In the embodiment shown by FIG. 1, there are four coupling pins 142 on the front module 110 and four clips on the adjacent application module $130_2$. Note that the clips 140 rotate on a pivot pin 143 on the adjacent application module $130_2$. A second application module $130_1$, is then coupled to the adjacent application module $130_2$ by moving the modules together. Coupling pins 142 on both the right and left edges of adjacent application module $130_2$, near the back, are then engaged when clips 140 on the second application module $130_1$ are rotated to the latched position. There is also a socket 178 shown on the second application module $130_1$ that mates with a connector on the back of the adjacent application module $130_2$ forming a portion of the segmented bus 144. The rear module 120 is then coupled to the second application module $130_1$ in a similar manner. When the four modules 110, $130_2$, $130_1$, 120 are secured together electrically and mechanically, the test unit 100 is assembled and configured to provide test functions corresponding to the operation and functionality of the two application modules $130_2$, $130_1$.

The segmented bus 144, partially shown as sockets 178 on the front bottom edges near the right side of the two application modules $130_{1,2}$ and on the rear module 120, is adapted to connect to a complementary plugs on the back of each adjacent module. For example, the front module 110 couples electrically to the adjacent application module $130_2$ via the socket and a complementary plug (not shown) on the backside of the front module 110. When the test unit 100 is assembled, the segmented bus 144 formed by the sockets and complementary plugs, is utilized for transferring control information, power, and data between and within modules.

Preferably, the front module 110, the two application modules $130_2$, $130_1$, and the rear module 120 are secured together by electrically engaging the modules and then sequentially rotating the clips 140 to a locked position. The sequential rotation starts with the rotation of the clips 140 on the adjacent application module $130_2$, followed by the rotation of the clips 140 on the second applications module $130_1$, and ends with the rotation of the clips on the rear module 110. Because of the offset rounded shapes on each end of the clips 140 (seen clearly in FIGS. 3A and 3B), the clips are preferably sequentially engaged in order for the clips to lock the test unit 100 together.

When it is desired to reconfigure the test unit 100, it may be necessary or desirable for the modules 110, 120, $130_{2,1}$ to be separated. In order to unlatch the clips 140, the sequential rotation of clips preferably is followed in reverse order. The clips on the rear module 120 are unlatched first, then the clips on the application module $130_1$ next to the rear unit, are unlatched followed by unlatching the clips on the adjacent application unit $130_2$. If there are more than two application modules in the stack of modules, then the additional modules are similarly sequentially unlatched. The preferred sequential latching and unlatching of the clips has the benefit of reducing the chance that the clips may be unintentionally released or attached. In addition, the sequential latching and unlatching process provides a means for locking modules 110, 120, 130 together with a cable lock 146. When the cable of cable lock 146 is inserted through the eye of tab 148, the clip on the rear module 120 next to the tab can not be rotated from the latched to the unlatched position. Because of the sequential unlatching process, none of the clips in the latching chain can be unlatched.

A view of the left side of the test unit 100 of FIG. 1 is shown in FIG. 3. The front module 110 is the first of the four modules and is followed by an adjacent application module $130_2$, a second application module $130_1$ and the rear module 120. The adjacent application module $130_2$ in FIG. 3 is approximately an inch thick and the second application module $130_1$ is approximately two inches thick. On left edge at the top of the test unit 100 is shown a clip 140 secured to coupling pin 142 on the front module 110. The clip is fastened to the pivot pin 143 near the top of the adjacent module $130_2$. On the bottom left edge of the adjacent module $130_2$ is another coupling pin 142 that is secured by the clip 140 that pivots on the pivot pin 143 near the top of the second application module 130₁. Finally, still on the left edge of FIG. 3, the clip 140 on left edge of the rear module 120 is coupled to pin 142 on the second applications module 130₁. Similar couplings are preferably on the right edge of the left side, shown on FIG. 3, and on the right side (not shown) of the test unit 110. Note that there is no clip on the front module 110 and there is no coupling pin on the rear module 120. Preferably, there are four clips couplings and holding each of the modules 110, 120, 130 together to form the assembled test unit 100.

Preferably, the test unit 100 is capable of supporting, mechanically and electrically, up to approximately 8 inches of applications modules 130 stacked between the front module 110 and the rear module 120, although other dimensions are possible. For example, 4 two-inch application modules 130 may be stacked between the front module 110 and the rear module 120. Other combinations would readily be apparent, such as 2 two-inch application modules 130 and 4 one-inch application modules 130. Preferably, the application modules 130 may be placed in any order between the front module 110 and the rear module 120 without any loss of functionality. The test unit 100 has a bus 144 that preferably passes through and connects to each of the application modules 130, wherein the bus is adapted for transferring control information and data to and between each of the application modules 130. The front module 110, having control logic 170 with memory and interface circuits, preferably independently activates or turns off any of the application modules 130. Further, the front module 110 preferably has input/output ports to receive and transfer information and commands to/from local and remote devices. The test unit 100 preferably is capable of simultaneously testing and monitoring different types of data links where one or more types of data links corresponds to each application module 130. Each application module 130 preferably transmits and/or receives data over different types of communication links and may perform out of service mode loopback tests and other known tests. The stackable module arrangement forming the test unit 100 has the flexibility to adapt to new network technology while meeting the needs of equipment manufacturers, network service providers and network customers.

Figure 4:
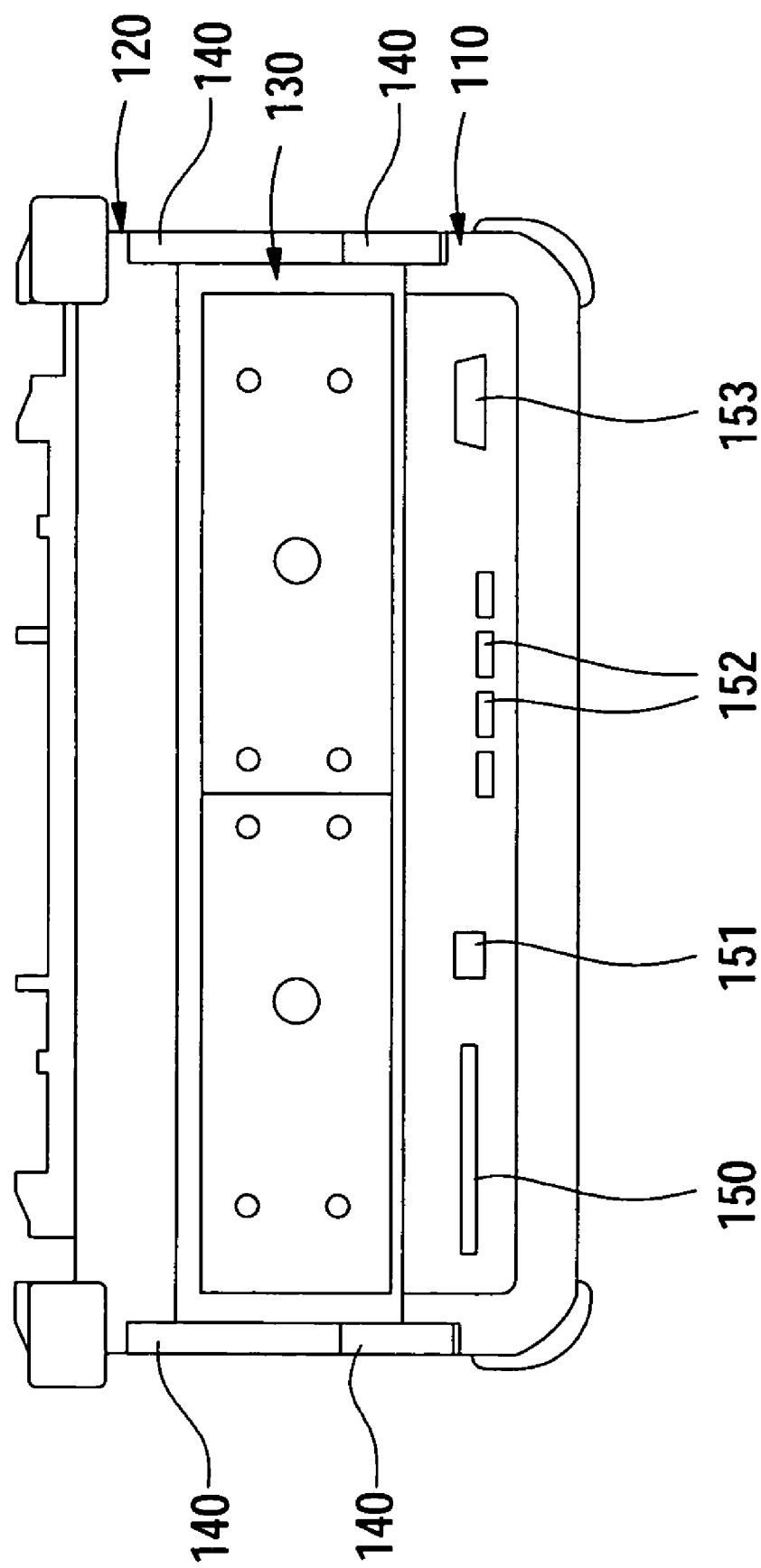
FIG. 4 is a top view of the test unit of FIG. 1.

The test unit 100 preferably communicates with other input/output (I/O) devices using a variety of connection ports as illustrated in the top view of FIG. 4. Connections to I/O devices are made via ports on the top of the front module 110. For example, a wireless card may be inserted in wireless card socket 150 for connection to a laptop computer over a wireless link. Preferably, the test unit 100 also has an Ethernet port 151 that may be used for coupling to the internet with internet connected I/O devices. A parallel port 153 is preferably used to couple the test unit 100 to a printer for printing test results. Several USB ports 152 are available on the top of the front module 110 and may be used to connect I/O devices to the test unit 100. The front module 110 provides the test unit 100 with a variety of means for connecting to external I/O devices. Various other types and numbers of I/O devices may be utilized in other embodiments.

FIGS. 5A-E are diagrams illustrating an application module 130 having removable sub-modules 160. Preferably, the application module 130 has two slots with alignment guides for receiving the sub-modules 160 as shown in FIG. 5A where the sub-modules 160 partially inserted. Preferably, each sub-module 160 has two pivoting latches 162, shown in FIGS. 5B and 5C, that are adapted to secure the sub-module 160 within the housing of the application module 130. One end of the pivoting latch 162 has a hook-shaped tip 163 that is adapted to lock to a tab 164 inside the housing of application module 130 as seen in FIGS. 5D and 5E. FIG. 5D shows the pivoting latch 162 locked to the tab 164. The pivoting latch 162 is in the unlocked position in FIG. 5E. The utilization of sub-modules 160 allows for reducing the cost of application modules 130 that may require hardware changes to be compatible with modified test requirements. The use of sub-modules 160 preferably allows for reuse of components within the application module 130 and may provide new functionality to meet new or different test requirements at a reduced cost.

Figure 6:
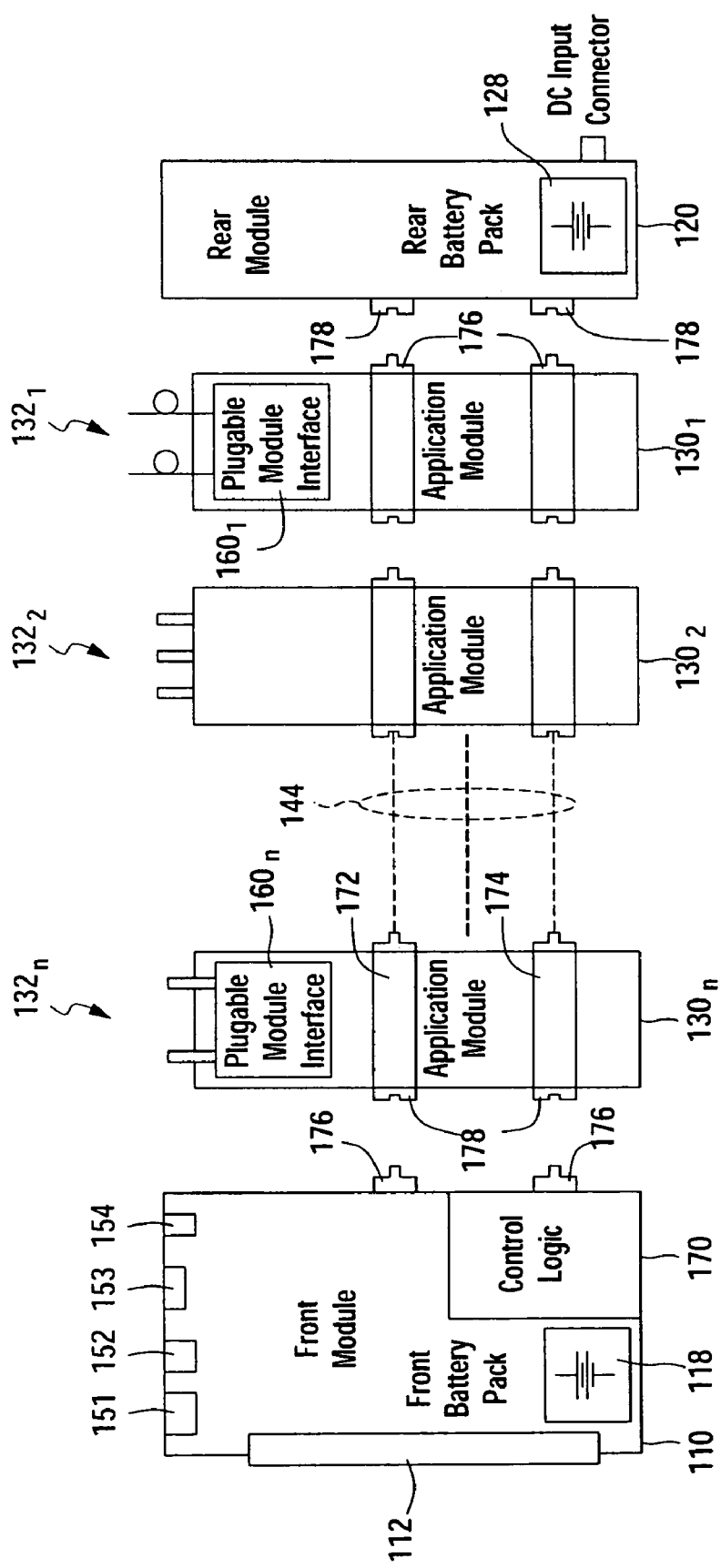
FIG. 6 is a block diagram illustrating electrical and mechanical connections for the test unit of FIG. 1.

A block diagram illustrating the electrical and mechanical arrangement for modules 110, 120, 130 of the test unit 100 of FIG. 1 is illustrated in FIG. 6. The front module 110, on the left side of FIG. 6, is positioned to receive application modules $130_n, \ldots, 130_1$ and rear module 120. The modules are shown in unengaged positions. When electrical plugs 176 and sockets 178 are engaged, they form the segmented bus 144 for the test unit 100. The bus 144 passes through and connects within each of the application modules 130 and has one end within the front module 110 and another end within the rear module 120. Preferably, the segmented bus 144 is comprised of a telecom/protocol bus 172 and a processor bus 174. Each of the two busses 172, 174 preferably transfer data and information at rates to allow for simultaneous control of and data transfer to/from multiple application modules 130. In a preferred embodiment each of the two busses has a bus data rate of approximately 40 Gbps which is sufficient for supporting up to eight application modules 130.

As indicated in the discussion of the FIGS. 1 and 4, the front module has a touchscreen 112 and I/O ports 151, 152, 153, 154 for connecting to external devices. In addition, the front module 110 has a front battery pack 118 and a processor 170. The segmented bus 144 of the test unit 100 preferably is comprised of a protocol bus 172 and a processor bus 174. Each of the application modules 130 preferably provides a segment of the segmented bus 144. The bus has end segments on the front module 110 and the rear module 120. The control logic 170 preferably is adapted to provide logic and data processing functions for responding to information and data on the protocol bus 172 and the processor bus 174, and for responding to connections to external devices. The front battery pack 118 preferably provides power to the front module 110 when the rear module 120 and application modules 130 are not connected.

As indicated earlier there is a multiplicity of application modules 130 having the functionality to test a variety of network links. As shown in FIG. 6, the application module $130_n$ contains one or more sub-modules $160_n$. Connectors $132_n$ on application module $130_n$ preferably are elements of the sub-module and provide, for example, connections to test DS-3 or DS-1 communication links. Another application module $130_2$ does not use sub-modules and may be used, for example, to test ISDN communication links. A third application module $130_1$ preferably has two sub-modules $130_1$ adapted to connect to an optical link for monitoring SDH/SONET communication links. Although the test unit 100 preferably is adapted for supporting up to eight application modules 130, the number of application modules that is acceptable in a stack of modules is limited only by size and weight. As test requirements and communication technology evolve, updated and new application modules 130 preferably are developed to meet new requirements.

The rear module 120, as shown in FIG. 6, preferably has a rear battery pack 128 and sockets 178 for connecting the rear module to the bus the test unit 100. The rear module preferably has a connection (not shown) for charging the rear battery pack 128 and may also charge the front battery pack 118 using wires of the bus. In addition the rear module 120 has a multi-position foot that will be described in detail in discussions of FIGS. 7 and 8. The multi-position foot allows a user to place the test unit 100 in multiple viewing positions.

Figure 7A:
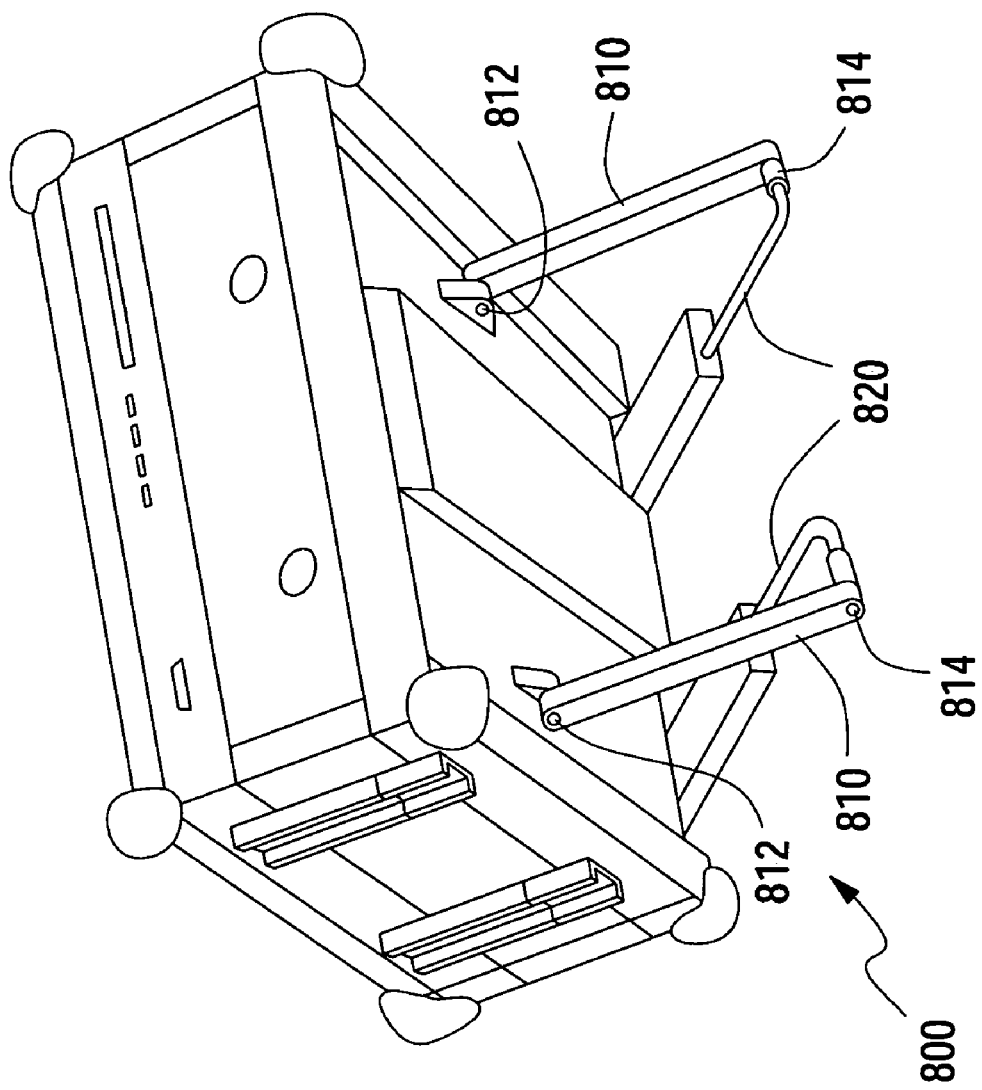
FIG. 7A is a rear view of the test unit of FIG. 1 illustrating the multi-position foot of the test unit.

A perspective view of the test unit 100 showing details and the operation of the multi-position foot 800 is illustrated in FIG. 7A. The multi-position foot 800 preferably has two support arms 810 pivotally coupled on a first end to the midpoint of each edge on the backside of the rear module 120. The second end of each support arm 812 is adapted for resting on a horizontal surface such as a desk top or bench top. The second end of each support arm 810 is also pivotally coupled to one end of a bottom bar 820. There is one bottom bar 820 for each support bar 812. The other end of each bottom bar has a slotted retainer 830. Each slotted retainer 830 has a support protrusion and there is also a support protrusion near the intersection of the support arm 810 and the bottom bar 820.

Figure 7B:
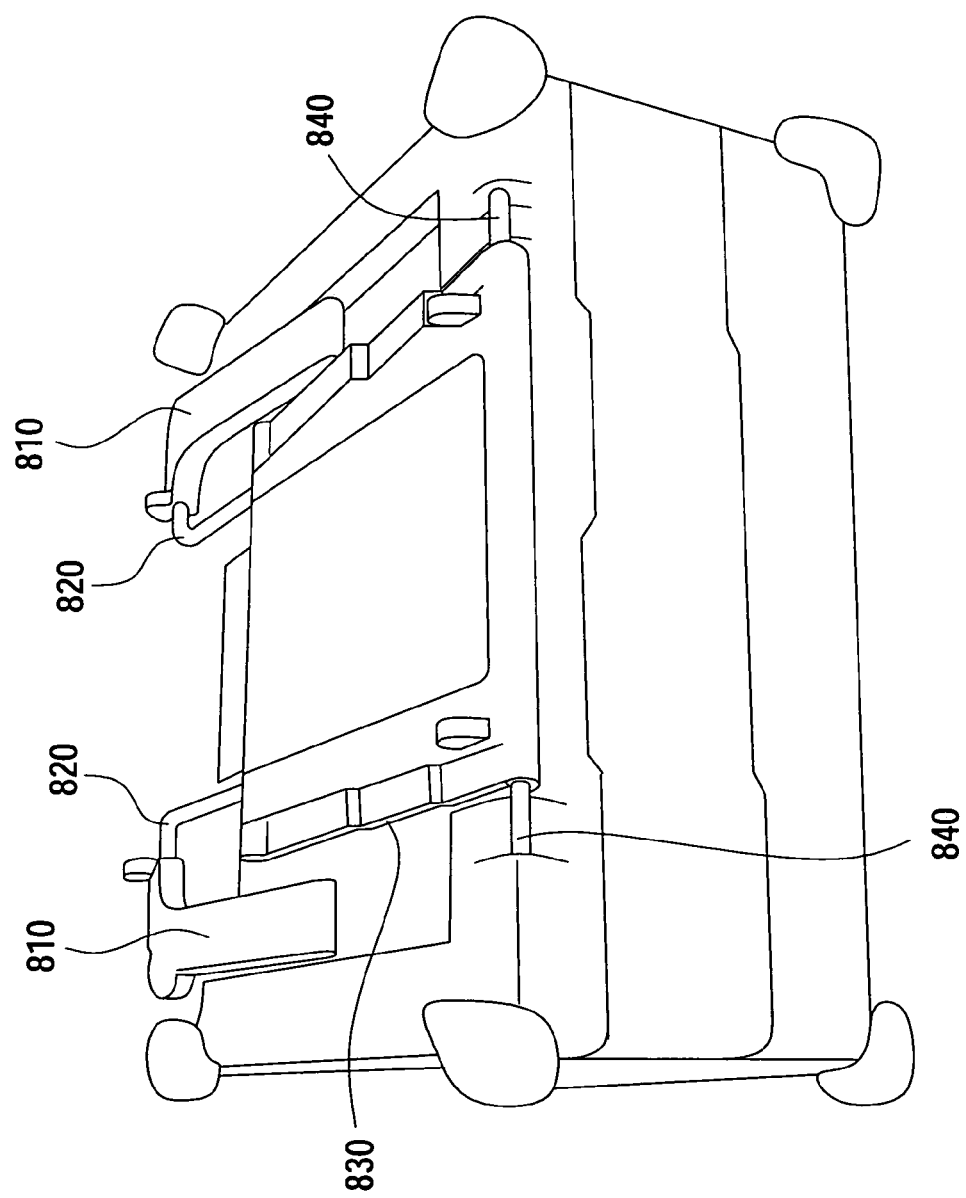
FIG. 7B is a view of the bottom of the test unit of FIG. 1 illustrating the multi-position foot in a stored position.

FIG. 7B is a view of the rear module 120 showing the multi-position foot 800 in a retracted position with the support arms 810 and bottom bars 820 against the bottom of the rear module. A round adjustment rod 840 is shown on the front edge of the rear module 120 of test unit 100.

FIG. 8A shows the test unit 100 with the bottom of the test unit resting on a horizontal support surface with the display screen 112 on the front module 110 in a vertical position. The multi-position foot 800 is retracted in FIG. 8A and cannot be seen when viewing the test unit from the side.

FIGS. 8B-D show the test unit 100 oriented in three different viewing positions. Details of the slotted retainer 830 for each of the three positions is shown in FIG. 8E. FIG. 8B shows the viewing screen making an angle of approximately thirty degrees with the horizontal support surface. Support arm 810 is shown connected to a first pivot point 812 located on the rear module 120. The other end of the support arm 810 is connected at a second pivot point 814 on the bottom bar 820 and a support protrusion extends downward from the second pivot point. The second end of bottom bar 820 is a slotted retainer 830 that preferably has three slots as best seen in FIG. 8E. A round adjustment rod 840 oriented perpendicular to the x-y plane is attached near the bottom of the backside of the rear module 110. The adjustment rod 840 is adapted to fit into slots in the slotted retainer 830. The slotted retainer 830 preferably has three slots 831, 832, 833 adapted to function as retaining notches as best seen in FIGS. 8E. As indicated above, when the multi-position foot 800 is stored against the back of the rear module the test unit preferably sits on the bottom of the test unit 100 and the touchscreen 112 is in vertical position. However if it is desirable to have touchscreen 112 positioned for horizontal viewing, the test unit 100 may rest on the backside of the rear module 110.

The multi-position foot 800 preferably provides the test unit 100 with an additional three angles for viewing the screen that are between the vertical view and the horizontal view. Referring now to FIG. 8B there is shown the test unit 100 position at a first angle where the backside of the rear module 110 makes an angle of around thirty degrees with respect to surface on which the unit 100 sits. The adjustment rod 840 is placed in the first slot 831. In order to orient the test unit in a second viewing position of around forty five degrees, the adjustment rod 840 is removed from the first slot 831, and moved in the negative x direction and placed in the second slot 832. If it is desired to have the touchscreen 112 viewed at an angle of around sixty degrees, then the adjustment rod 840 is moved to a third slot 833. The test unit 100 preferably has the touch screen 112 selectively viewable either horizontally, vertically or at one the three angles provided by the multi-position foot 800. The number of viewing positions provided by the multi-position foot 800 may be fewer or more than three and preferably is provided by having fewer or more slots in the slotted retainer 830.

Because a user can move the adjustment rod 840 out of and into the slots in the slotted retainer 830, the multi-position foot 800 requires no tools for changing viewing positions. In addition, the multi-position foot 800 provides the same viewing angle for a user independent of the number application modules 130 secured between the front module 110 and rear module 120 of the test unit 100. In the preferred embodiment, the support arm 810 is made of plastic, the bottom bar 820 is made of metal, the slotted retainer 830 is made of plastic, and the adjustment bar 840 is made of metal. The pivot points 812 and 814 may be fabricated using a variety of methods as would be understood by one skilled in the art.

As a means for increasing battery life, test unit 100 is provided with a power management system wherein the test unit has three possible power states controlled by the power management system. In the ON-state, the test unit 100 is fully operational wherein the front module 110 and application modules 130 are using power as determined by a selected functionality. The test unit 100 may also operate in a SLEEP-state where there is a limited module operation, but sufficient to allow the test unit to transition to the ON-state in a few milliseconds. The power management system is adapted for supplying power to critical circuits when the test unit 100 is in the SLEEP-state. The third state of the power management system is the OFF-state where preferably power supply circuitry, such as battery charging circuits, remain functional and several selected circuits and switches are functional. The power management system allows the test unit 100 to operate on battery power for longer periods of time than was possible when the states of test unit were limited to fully on or fully off.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A telecommunication test unit for evaluating the performance of a data link, the test unit comprising:
   a rear module;
   a front module for controlling the test unit and processing performance information indicative of the performance of the data link;
   an application module electrically connected and mechanically secured between the rear module and the front module, wherein the application module is coupled to the data link and is configured to provide the performance information to the front module; and
   a multi-position foot for positioning the test unit in different orientations, the multi-position foot comprising:

a first pivotable support arm coupled to a first bar having a slotted retainer; and
an adjustment rod extending into the slotted retainer, the adjustment rod movable to different slots of the slotted retainer, wherein the test unit is placed in a different orientation by moving the adjustment rod to a different one of the slots.

2. The test unit of claim 1, wherein one or more additional application modules is placed between the front module and the rear module.

3. The test unit of claim 1, wherein the front module has one or more ports for coupling to an external user interface.

4. The test unit of claim 1, wherein the external user interface is a personal computer.

5. The test unit of claim 1, wherein the front module has a user interface.

6. The test unit of claim 1, wherein the rear module has a battery for providing power to the application module.

7. The test unit of claim 1, wherein the multi-position foot further comprises a second pivotable support arm coupled to a second bar, wherein the adjustment rod extends between the first bar and the second bar.

8. A method for providing a test unit to obtain performance information of a data communication link, the method comprising the steps of:
providing a back module with a power source;
providing a front module for controlling the test unit and receiving performance information;
selecting an application module adapted for monitoring the performance of one or more data links;
stacking the front module, application module, and back module in sequence and electrically connecting and mechanically securing the modules together so that the stacked modules form the test unit;
providing electrical power from the power source of the back module to the application module;
monitoring, via the test unit, the performance of one or more data links; and
displaying results of the monitoring step.

9. The method of claim 8, further comprising the step of providing electrical power from the power source to the front module.

10. The method of claim 9, further comprising the step of providing electrical power from a power source in the front module to components of the front module.

11. The method of claim 10, wherein the step of providing electrical power from the power source in the front module is based on the connecting step.

12. A system for providing a multifunction test unit, the system comprising:
a back module having a power supply;
a front module having control logic for controlling the system and processing performance information; and
two or more application modules secured between the back module and the front module wherein each of the application modules is adapted to provide performance information about a different type of communication link, wherein each application module furnishes performance information to the front module, and wherein the power supply of the back module provides electrical power to the each of the application modules.

13. The system of claim 12, wherein the power supply provides electrical power to the front module.

14. The system of claim 13, wherein the front module has a power supply that provides electrical power to components of the front module.

15. A system for providing a multifunction test unit, the system comprising:
a back module having a power supply;
a front module having control logic for controlling the system and processing performance information; and
two or more application modules secured between the back module and the front module, wherein each of the application modules is adapted to provide performance information about a different type of communication link, wherein each application module furnishes performance information to the front module,
wherein the back module has a multi-positional foot comprising:
a set of support arms that pivot near the center of the back module;
an adjustment arm for each of the support arms that is pivotally coupled to each of the support arms on one end and has a slotted retainer with multiple slots on the other end; and
a rod secured to the bottom back edge of the back module that is coupled to the slotted retainers wherein a multiple viewing angles are provided by the slot location of the rod within the slotted retainer.

16. A method of stacking and latching electronic modules to provide a test apparatus the method comprising the steps of:
positioning a front module to receive an application module;
placing a first application module on the front module and electrically coupling the first application module to the front module and then latching the application module to the front module;
stacking and latching one or more additional application modules to the first application module, thereby increasing the functionality of the test apparatus;
securing a back module to the last application module of the stacking step;
pivoting a first support arm about a point on the test apparatus, the first support arm having a slotted retainer; and
moving an adjustment rod to different slots of the slotted retainer such that an orientation of the test apparatus is changed;
monitoring, via the test apparatus, the performance of one or more data links; and
displaying results of the monitoring step.

17. The method of claim 16, wherein a bus structure between the front module and the back module is connected to each of the application modules.

18. The method of claim 17, wherein the bus structure comprises a protocol bus and a processor bus.

19. The method of claim 17, wherein the rear module has a rear battery pack that provides electrical power to each of the application modules.

20. The method of claim 19, wherein the front module has a display panel.

21. The method of claim 20, wherein the display panel is a touch screen.

22. The method of claim 17, wherein the front module has multiple connectivity ports.

23. The method of claim 16, further comprising the step of pivoting a second support arm about a point on the test apparatus, the second support arm coupled to a second bar, wherein the adjustment rod extends between the first bar and the second bar.

24. A telecommunication test unit for evaluating the performance of a data link, the test unit comprising:

a first module having control logic; and a plurality of removable application modules stacked on and communicatively coupled to the first module the application modules configured to respectively perform different types of tests on at least one data link, each of the application modules having a rotatable latch that rotates to mate with a respective latch of another of the application modules, wherein the control logic is configured to receive diagnostic information from each of the application modules and to provide an output indicative of the diagnostic information.

25. The test unit of claim 24, further comprising a segmented bus passing through each of the application modules, wherein each of the application modules is configured to communicate with the control logic over the segmented bus.

26. The test unit of claim 24, wherein at least one latch of one of the application modules has a rounded end for mating with a rounded end of another latch.

27. The test unit of claim 26, further comprising a module stacked on one of the application modules and having a power source for providing electrical power to each of the application modules.

28. A telecommunication test unit for evaluating the performance of a data link, the test unit comprising:

a first module having control logic; and a plurality of removable application modules stacked on and communicatively coupled to the first module the application modules configured to respectively perform different types of tests on at least one data link, a segmented bus passing through each of the application modules, wherein each of the application modules is configured to communicate with the control logic over the segmented bus, wherein the control logic is configured to receive diagnostic information from each of the application modules and to provide an output indicative of the diagnostic information, and wherein the test unit further comprises a multi-position foot for positioning the test unit in different orientations, the multi-position foot comprising:

a first support arm coupled to a first bar having a slotted retainer;

a second support arm coupled to a second bar; and an adjustment rod extending into the slotted retainer and between the first bar and the second bar, the adjustment rod movable to different slots of the slotted retainer, wherein the test unit is placed in a different orientation by moving the adjustment rod to a different one of the slots.

29. A method for evaluating the performance of data links, comprising the steps of:

providing a telecommunication test unit having an output module;

stacking at least a first application module and a second application module on the output module, each of the first and second application modules removable from the telecommunication test unit;

securing the first application module and the second application module, the securing step comprising the step of rotating a respective latch on each of the application modules until said respective latch mates with another latch on one of the other modules;

testing a first data link via the first application module;

testing a second data link via the second application module; and outputting from the output module diagnostic information based on each of the testing steps.

30. The method of claim 29, further comprising the step of transmitting a portion of the diagnostic information from the second application module to the output module via a segmented bus, the segmented bus having a first segment on the first application module, a second segment on the second application module, and a third segment on the output module.

31. The method of claim 29, wherein at least one latch of one of the application modules has a rounded end for mating with a rounded end of another latch.

* * * * *